United States Patent [19]

Eagon et al.

[11] 4,104,102
[45] Aug. 1, 1978

[54] METHOD OF MAKING A RETROREFLECTIVE LAMINATE

[75] Inventors: Beverly M. Eagon, Hudson; Russell L. Carlson, Tallmadge; Raymond C. Fry, Stow, all of Ohio

[73] Assignee: Morgan Adhesives Company, Stow, Ohio

[21] Appl. No.: 713,790

[22] Filed: Aug. 12, 1976

Related U.S. Application Data

[62] Division of Ser. No. 552,325, Feb. 24, 1975, Pat. No. 4,023,889.

[51] Int. Cl.$^2$ .............. B05D 5/06; B32B 31/00
[52] U.S. Cl. .................. 156/298; 156/300; 156/332; 350/104; 350/105; 428/40; 428/325; 428/913; 427/25; 427/27; 427/32; 427/163; 427/204
[58] Field of Search .......... 427/25, 27, 32, 163, 427/33, 204, 199, 411; 350/104, 105; 156/298, 300, 332; 428/40, 325, 913

[56] References Cited

U.S. PATENT DOCUMENTS

| | | | |
|---|---|---|---|
| 2,543,800 | 3/1951 | Palmquist et al. | 427/204 X |
| 2,555,715 | 6/1951 | Tatum | 427/204 X |
| 2,646,364 | 7/1953 | Porth | 350/105 X |
| 3,172,942 | 3/1965 | Berg | 427/204 X |
| 3,236,677 | 2/1966 | Bradstreet | 427/379 X |
| 3,309,257 | 3/1967 | Borack | 428/40 |
| 3,331,729 | 7/1967 | Danielson et al. | 428/40 |
| 3,567,307 | 3/1971 | Rideout et al. | 350/105 |
| 3,702,213 | 11/1972 | Schwab | 350/105 |
| 3,934,065 | 1/1976 | Tung | 350/105 X |
| 3,936,567 | 2/1976 | Vessely | 428/325 |

FOREIGN PATENT DOCUMENTS

| | | | |
|---|---|---|---|
| 940,424 | 10/1963 | United Kingdom | 427/204 |
| 1,052,815 | 12/1966 | United Kingdom | 427/204 |

Primary Examiner—Ronald H. Smith
Assistant Examiner—Shrive P. Beck
Attorney, Agent, or Firm—Oldham, Oldham, Hudak & Weber Co.

[57] ABSTRACT

The laminate includes a partially cured, flexible acrylic face sheet having a primer layer on one surface thereof bonded to a binder layer having a layer of reflective glass beads embedded therein and protruding therefrom and a sealer layer on the exposed surfaces of the glass beads, the laminate being completed with a spacer layer bonded to the sealer layer and having a reflective mirror-like thin metal coating on the outer surface thereof. The binder layer, sealer layer and spacer layer, or films are all made from basically the same uncured polyvinyl butyral material. The method of forming the acrylic face layer, the use of soft rubber pressure rolls in bonding a glass bead carrying partial laminate to a preformed spacer film, and the method of making the laminate of the invention and the compositions used therein.

3 Claims, 9 Drawing Figures

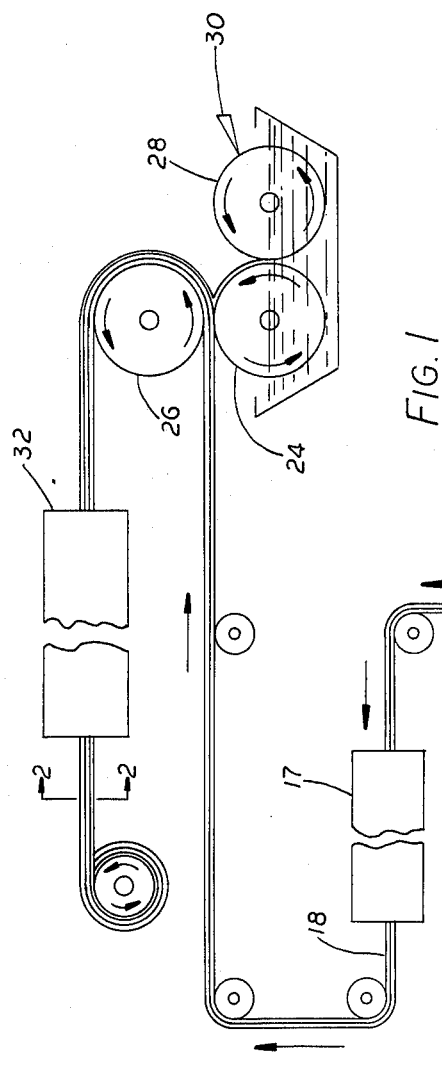
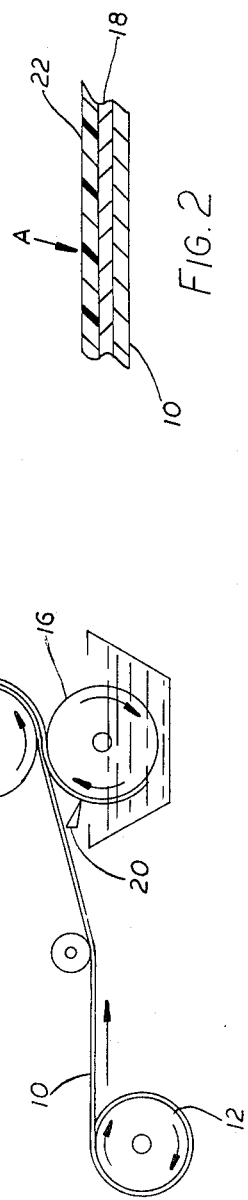
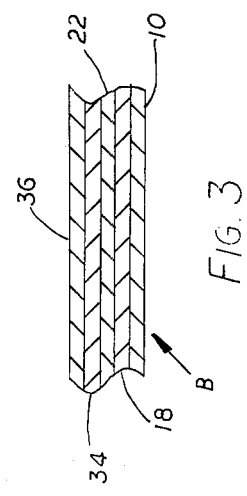
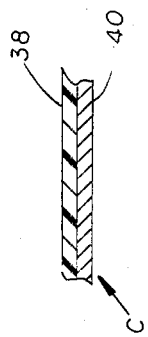

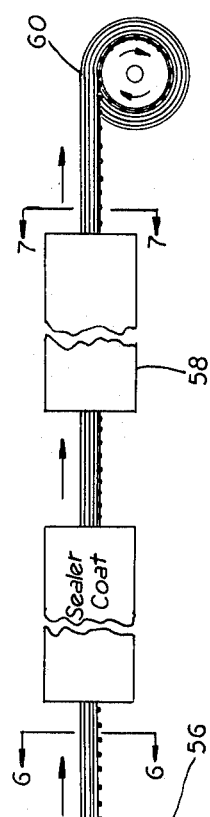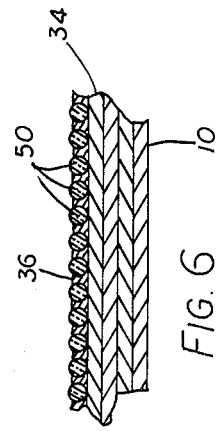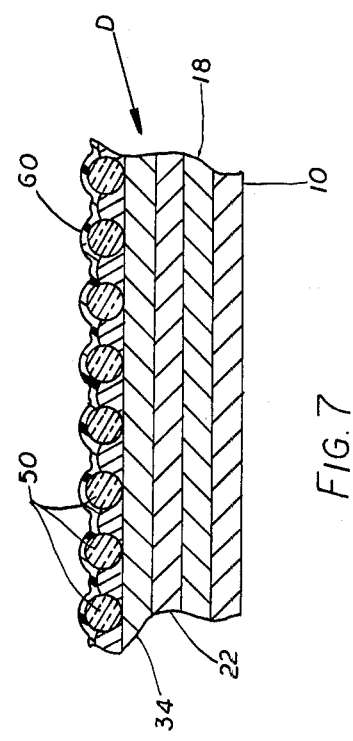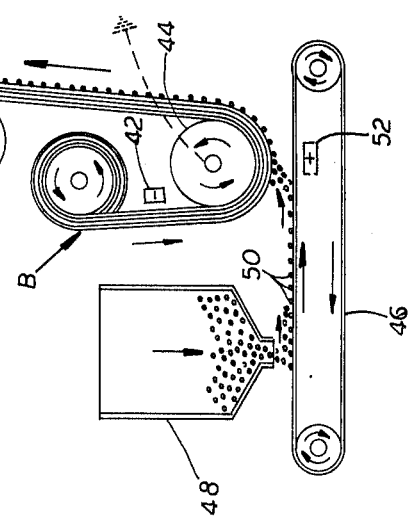

METHOD OF MAKING A RETROREFLECTIVE LAMINATE

This is a divisional application from prior application Ser. No. 552,325, filed Feb. 24, 1975 now U.S. Pat. No. 4,023,889.

BACKGROUND OF INVENTION

Heretofore there have been many different types of retroreflective laminates provided and used widely for a number of industrial and commercial purposes including highway signs, traffic markers, etc., wherein the signs or markers have the characteristic of reflecting a major portion of the light rays striking the sign regardless of the angle of incidence of such light rays and wherein the reflected light rays return to the light source substantially along the initial light ray path.

There has been a great amount of patent and commercial activity on various procedures to make laminates and the compositions thereof in the retroreflective laminate field. Typical prior patents include U.S. Pat. Nos. 2,432,928; 2,440,584; 2,543,800; 2,397,702 and 2,354,049 on various types of retroreflective laminates, including a layer of glass beads therein, and their methods of production as have been developed heretofore.

In the use of these retroreflective laminates, it is very important that the laminates have very good optical clarity, that it have an efficient reflective action for light rays striking the laminate at a relatively low angle of incidence, the laminates preferably are flexible, they should be adapted to have printed matter and inks deposited therein, the various layers in the laminates must be bonded together tightly, the laminate must be weather resistant, the beads must be securely positioned in the laminate, etc.

Some problems that have existed heretofore in the production of some retroreflective laminates is that a relatively high percentage of scrap has resulted in many instances by prior methods of manufacture of retroreflective laminates, the laminates in some instances have not been of uniform physical size, thickness and properties, and/or the beads may not be securely positioned in the laminate.

While many different types of laminates have been proposed and provided heretofore in the retroreflective laminate field, there is a need for a retroreflective laminate having a uniform physical and light reflecting characteristics over the entire area of the laminate, and to provide a laminate having a long service life and adapted to withstand continued exposure to the weather. Improved procedures for making the laminates also could be used in the industry.

It is the general object of the present invention to provide a retroreflective laminate having uniform physical properties throughout, which laminate has excellent resistance to weathering and has good bonding between all layers in the laminate, and to provide a method of producing an improved retroreflective laminate in which the glass beads are securely positioned.

Another object of the invention is to provide a laminate having a face or surface layer formed from a partially cured resilient acrylic material which is quite resistant to degradation and provides a long service life in a retroreflective laminate exposed to the weather, which face surface has excellent optical properties, is resistant to solvents, resistant to atmospheric degradation and can accept printing data and inks thereon.

Another object of the invention is to utilize improved bonding techniques for securing a layer of glass beads in a retroreflective laminate and for forming and using a preformed reflective backing or spacer layer in the laminate which layer is positioned in close, accurately spaced uniform relation to the glass beads in the laminate product.

Other objects of the invention relate to the provision of a chrome complex release coat on a carrier film used in producing the laminate of the invention and which has the acrylic polymer film material received and processed thereupon; to use the same basic polyvinyl butyral material in forming a binder layer, a spacer layer and a secondary binder or a sealer layer in the laminate; to improve the bonding of the layer of glass beads in the laminate by a liquid sealer layer applied to the exposed surfaces of the glass beads and binder layer and dried thereon prior to association of the preformed reflective or spacer layer thereto; to provide a nitrocellulose bonding layer for securely attaching the glass bead binder layer to the acrylic face layer in the laminate; to preform a spacer layer for use in the laminate and apply a metallized backing layer thereto prior to laminating the spacer layer with a second preformed laminate having a layer of glass beads thereon and exposed on one surface thereof for engagement with the spacer layer; and to control the lamination action and obtain uniform contact in adjacent layers when forming the end product by control of the durometer of a rubber backing roll used in the laminating action.

The foregoing and other objects of the invention will be apparent from the following specification.

It should be noted that the various layers in the laminate of the invention are shown in the drawings of exaggerated thickness and that all of such layers are quite thin such as from about ½ up to about 4 or 5 mils in thickness as indicated in the specification.

Reference is now made to the accompanying drawings, wherein:

FIG. 1 is a diagrammatic view of apparatus for and a method of practicing the present invention and specifically shows the formation of a laminate from a carrier film and a face layer used in forming the article of the invention;

FIG. 2 is a fragmentary enlarged section taken on line 2—2 of FIG. 1;

FIG. 3 is an enlarged section like FIG. 2 but with the laminate having binder and primer layers thereon as further steps in the method of the invention;

FIG. 4 is a fragmentary enlarged elevation through a spacer or reflective film used in forming the end laminate of the invention;

FIG. 5 is a diagrammatic view of apparatus for and a method of applying a layer of glass beads to the laminate of FIG. 3;

Figure 8:
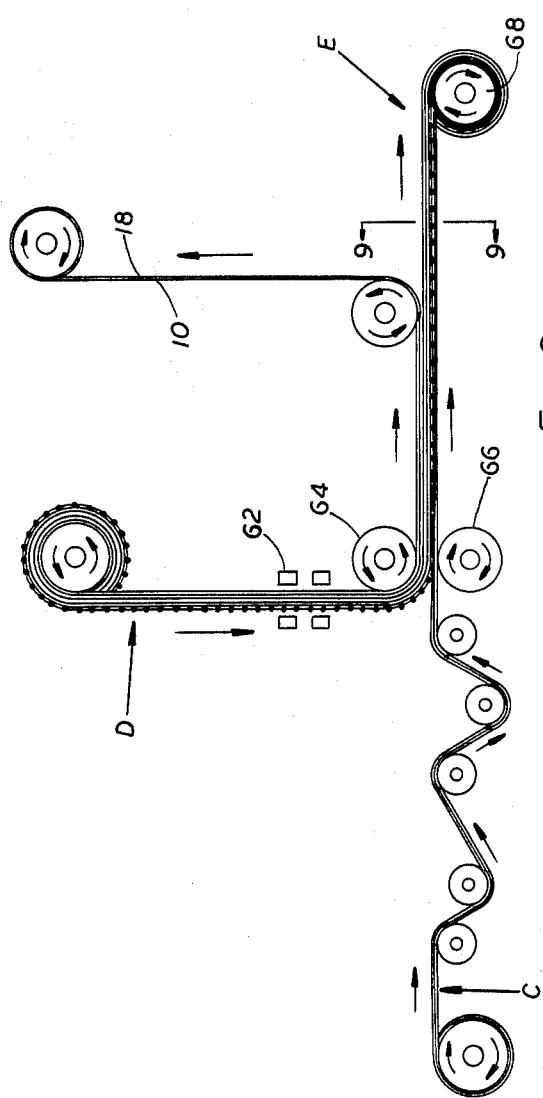
Figure 9:
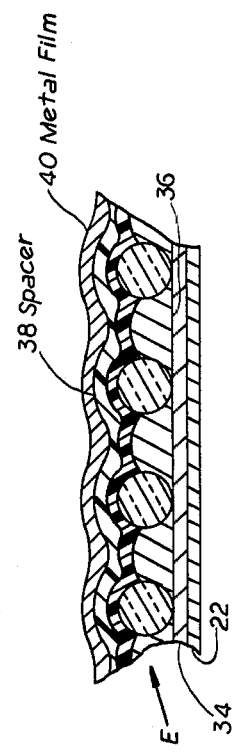

FIGS. 6 and 7 are fragmentary enlarged sections taken on lines 6—6 and 7—7, respectively, of the laminates shown in FIG. 5;

FIG. 8 is a diagrammatic view of apparatus for and the method of laminating the laminate of FIG. 7 to the laminate of FIG. 4 to provide the end laminate of the invention; and FIG. 9 is a fragmentary enlarged vertical section through the retroreflective laminate structure of the invention.

When referring to corresponding members shown in the drawings and referred to in the specification, corresponding numerals are used to facilitate comparison therebetween.

SUBJECT MATTER OF THE INVENTION

The invention as one embodiment thereof relates to a retroreflective laminate comprising a resilient light and solvent resistant acrylic face layer, a nitrocellulose primer layer on the back surface of the face layer, a binder layer on and bonded to the primer layer, a layer of glass beads embedded in the binder layer and protruding therefrom away from the primer layer, a sealer layer over the binder layer and protruding glass beads, and a spacer layer bonded to the sealer layer and having a reflective metal film on the face thereof spaced from the sealer layer, all of such layers being bonded together and being substantially transparent and having good optical properties. The invention also relates to a method of making a retroreflective laminate including the steps of forming a laminate with a layer of glass beads embedded in and protruding from one surface of a binder layer to form an irregular surface thereon, applying a liquid sealer layer to the surface of the binder layer and the protruding glass beads, drying the sealer layer, and laminating the inner surface of a spacer film having a reflective metal film on its outer surface to the sealer layer under controlled heat and pressure conditions to bond the layers together and form a retroreflective laminate.

Regarding the details shown in the drawings, a carrier film 10 is suitably withdrawn from a carrier roll 12 and passed to a pair of rolls 14, 16 for application of a release coat thereto.

The carrier film 10 may be a polyester casting sheet, such as one made from Mylar, a polyester manufactured by Du Pont, but it also may be a paper carrier or a polyolefin film. Such film 10 has a release coat made from a liquid chrome complex of $C_{14} - C_{18}$ fatty acids, such as stearic and palmitic, and specifically Quilon C (E. I. Du Pont) applied thereto from an ethyl or isopropyl alcohol solution by the pair of rolls 14, 16. The release coat is dried in an oven 17 for about ½ – 2 minutes at about 200° – 250° F. to form the release layer 18.

The roll 16 used to apply the coating preferably has a trihelix engraved surface to facilitate uniform pickup and deposit of such coating solution from a tank containing the solution and a doctor bar or knife 20 controls the amount or thickness of the layer applied to the carrier film.

Next, a top coat or face layer 22 is applied to the release layer 18 on the carrier sheet 10 to form a laminate A.

The top coat is made from selected cross-linked acrylic polymers. These acrylic polymers are made from hydroxyl functional (such as preferred materials acrylic 120 from Conchemo or AT-56 from Rohm & Haas) and COOH functional acrylics and are cross-linked to a limited extent with a preferred compound such as melamine formaldehyde, or urea-formaldehyde resin and a conventional acid catalyst such as paratoluene sulfonic acid or butyl phosphoric acid. The preferred acrylics have an ester ratio of methyl to ethyl of 1 to 3. The above noted preferred acrylic polymers have the desirable properties of a flexible thermoset, good weatherability, clarity even after prolonged exposure, insoluble with respect to most solvents and do not yellow. Other acrylic polymers which lack these desired features are thus not within the scope of this invention.

A typical composition comprises:

|  | Parts |
| --- | --- |
| acrylic polymer | 100 |
| melamine formaldehyde | 15 |
| paratoluene sulfonic acid | 1 |
| solvents    MEK, toluene, cellosolve (each substantially 40 parts) | 120 |
| cured at 295° F. for 5 minutes | |

This face or top coat composition is cast from a three-roll reverse coater onto the release coated carrier film as indicated in FIG. 1. Such roll stand comprises a casting roll 24, a backup roll 26, and a metering roll 28 which rotate in the directions indicated. A doctor bar 30 cleans the surface of the roll 28 and it is spaced from the casting roll 24 an accurately controlled short distance to control the thickness of the layer of liquid deposited on release coated carrier film. Such coated film then passes to a suitable oven 32 where the solution is dried and the acrylic partially cured at about 300° F. for from about 1 to 5 minutes in the circulating air oven 32. Such face layer 22 is dried and partially cured. The face layer or film is from about ½ to 2 mils thick and it forms a tough, resilient member or layer. The face layer or film 22 will constitute the external surface of the end construction and provides resistance to solvents and resistance to atmospheric degradation (UV light, oxygen, ozone and oxides of nitrogen) and printability with silk screen or gravure printing using, for example, alkyd, vinyl or acrylic inks. The cross-link in its cure provides structural strength at elevated temperatures under moderate load stress. Another of its physical characteristics is its resistance to breaking or deformation when the surface is struck by gravel or other materials at high speed at environmental temperatures. Because this film 22 transmits light as an integral part of its function, the highest optical clarity is required. The optical characteristics of this film and the other films in the end laminate are important to achieve the retroreflective characteristics needed. Using the thick lens formula and knowing the refractive indexes of the beads and surrounding media, the theoretical spacing distance of the glass beads from the reflective back layer can be calculated.

Next, the laminate product A of FIG. 2 is again passed through the apparatus of FIG. 1 and at the rolls 14 and 16, a primer coat composed of nitrocellulose dissolved in a conventional solvent to control viscosity, as for example about 6 parts ethyl acetate and 25 parts isopropanol to form about a 15% solution is applied by the gravure cylindrical roll 16. Such coating is dried at about 180° to 200° F. for about ½ minute to form a primer layer 34. The temperature of the oven 17 is suitably controlled for such action. Then a binder coat or layer 36 is applied to the dried primer coat 34 on the modified laminate, as by the described three-roll reverse coating apparatus and dried at about 100° to 250° F. for from about 1 to 5 minutes to provide the binder layer of from about ½ to about 3 mil thickness.

This binder composition preferably is a polyvinyl butyral such as Butvar B-98 from Monsanto and it is used either unmodified or modified with various plasticizers such as Flexol 3 GH, or epoxy resins, or alpha pinene, or phenolic resins, or rosin derivatives. Butvar B-98 comprises about 18–22% OH-expressed as polyvinyl alcohol, 0–2.5% acetate expressed as polyvinyl acetate, and 88% butyral expressed as polyvinyl butyral. It has an average molecular weight of 30,000 – 34,000 and apparent modulus of elasticity of 3.1 – 3.2 × $10^5$ psi. The binder material and layer is designed to be flexible and accept glass beads propelled against the binder film layer when hot and to permit the beads to penetrate through the film when external pressure is applied to the beads. Modifiers, when used, are used to change the modulus of the polyvinyl butyral resin which remains flexible and uncured in its processing in the present invention. A typical film casting composition used comprised.

|  |  | Parts |
|---|---|---|
| polyvinyl butyral |  | 20 |
| solvent | ethyl alcohol | 80 |

Or, the solvent system may comprise about 40 parts ethyl alcohol, 20 parts ethyl acetate, 20 parts MEK, 10 parts cellosolve, and 10 parts toluene.

The binder liquid composition of the present invention has good wetting characteristics and flow out and with the carrier laminate is passed to and through the oven 32 or equivalent for the drying action, as previously stated, to form the laminate B of FIG. 3. The binder film material, polyvinyl butyral, (such as Butvar 98, or XYHL from Union Carbide), may be modified with various plasticizers (such as Epon 828, Epon 1001, from Shell Chemical) or alpha pinene (such as Newport V-40), or phenolic resins (such as Rexinox P-97 from Monsanto or Amberol ST-137 from Rohm & Haas) or rosin derivitives (like Staybelite Ester #10 or Hercolyn D from Hercules).

The flow behavior of this binder film and/or of the layer of material forming the film at elevated temperatures and pressure as described herein determine the conformance of the film to the surface of the impressed glass beads. This conformance is a critical factor in determining the physical and optical characteristics of the retroreflective film construction. In the final construction to obtain resistance to delamination, it is necessary to have a strong bond between the surface of the implanted beads and the binder film. In addition, the binder film must have physical characteristics which provide a proper stress gradient from the high modulus bead composition to the low modulus thermoplastic material surrounding the beads. Also, the binder film must have the resistance to deformation and impact under all atmospheric conditions.

When the binder layer 36 is directly applied to the top coat or layer 22, the bond between the two surfaces is low because of temperature limitations imposed by the nature of the films in processing and laminating the films. Also, at elevated temperatures, a diffusion of the curing agent from the top coat to the binder layer causes undesirable curing of the binder film. Uniform good adhesion is absolutely necessary between these two films. It was discovered that use of the primer coat or layer 34 serves to increase adhesion and reduce the long term possibility of diffusion of reactive chemicals from the top coat.

As a separate operation, a reflective spacer layer or film, FIG. 4, is made from a polyvinyl butyral of the same ranges of compositions as provided for the binder layer 36. The solution is cast onto a release coated casting sheet, such as one made from a casting paper, by the three-roll reverse coating apparatus of FIG. 1, and is dried at about 100° to 250° F. for about 1 to 5 minutes to provide a layer or film 38 with a thickness of from about 0.3 to 2 mils. The thickness of the spacer film is varied depending upon the size and refractive index of the glass beads to be used and the physical properties of the film. The film 38 then is removed from the casting sheet which is a hard, glossy alkyd coating on a paper surface and usually is a standard casting paper for vinyl films. Such film 38 is then conventionally coated with a vacuum applied flexible thin aluminum metal film 40 having from about ½ to 20 ohms psi. resistivity. The spacer layer, the laminate 6 of FIG. 4, can then be stored or put aside until ready for the final laminating step hereinafter described.

The characteristics of the spacer film must be such that in compression it will change thickness to the proper extent and will conform uniformly around the glass beads to provide a hemispherical mirror behind the glass beads.

The distance from the bead surface to the aluminum surface on the spacer film is the critical dimension which determines the reflective intensity at various incidence and divergency angles. In applying the spacer film, the conditions of lamination are designed to maintain the integrity of the film.

It was discovered that by metallizing the spacer film before laminating it to the other layers of the desired product, the process could be continuously monitored and the quality of the sheet controlled by changing the variables such as temperature, pressure and dwell time during the laminating process. Further, it was discovered that by premetallizing the spacer film, the metaliizing prevents the thermoplastic spacer film from adhering to the hot laminating roll, allowing a broader range of processing temperatures. Further, no "out gasing" is experienced as frequently happens when vacuum metallizing the completed construction.

Reference is now made to FIG. 5 indicating the method of applying glass beads to the laminate B of FIG. 3. A uniformly spaced coating of beads, and where the beads are closely packed but positioned in a mono-layer is best suited to make the retroreflective laminate of the invention. Specifically, the laminate is preheated as by any suitable heater means 42 and then moves around a metal roll 44. The laminate B is heated to from about 100° to 250° F. and the roll 44 is also heated to aid in softening the binder layer 36 on the surface of this laminate B, which surface is facing downwardly as the laminate is moved along a course parallel to and spaced a short distance from a driven rubber conveyor belt 46 that has a plurality of glass beads 50 deposited thereon from a hopper 48. The glass beads drop down onto the conveyor belt and a suitable electrostatic force of charge is set up between an electrode 52 below the belt and the grounded metal roll 44 so that the glass beads are forcibly drawn up from the rubber belt 46 to travel with considerable force to deposit onto the binder film surface of the laminate. Excess beads can be withdrawn by a vacuum duct, after which the laminate can be subjected to vibration or to a light brushing by a rotary brush to remove any additional excess beads on the surface of the laminate. The laminate B can move along a short course parallel to the belt 46 if desired.

After the heated laminate B has the glass beads loosely affixed to the surface thereof, it is passed promptly between a steel roll 54 and an unheated rubber coated roll 56 which has a shore durometer hardness Scale A of from about 75 to 90 with the beads contacting the roll 56. The hydraulic pressure on the rubber coated roll 56 to form the roll nip is between about 200 to 1,000 psi. and the penetration of the beads into the binder coating layer and the conforming of such layer around the beads is controlled by varying the hydraulic pressure on the rubber roll 56, the dwell time of the laminate as it passes between the rolls, the hardness of the rubber roll, and the temperature of the associated steel roll 54.

The rolls 54 and 56 are positioned closely adjacent the conveyor 46 and the layer of glass beads 50 is forced into and through the binder layer 36 to the primer layer 34 on the inner surface thereof. The beads protrude from the exposed surface of the binder layer.

Next, the laminate, FIG. 5, moves to a pair of rolls, such as the rolls 14 and 16, for application of a sealer coat to the beaded surface by coating a solution of polyvinyl butyral by the gravure cylinder of the pair of rolls onto the beads. This seal coat consists of a modified or unmodified solution of Butvar as in the binder coat. This sealer coating action must provide a very thin coating layer over the glass beads so as to avoid interference with the optical properties of the spacer film and the ultimate end laminate. Such sealer coating is suitably dried as in an oven 58 at about 180° F. for about 4 minutes to form a sealer layer or film 60.

A typical sealer coating is about 0.05 – 0.10 mils thick.

The low viscosity sealer coating composition comprised.

| Butvar 76 | 4 parts |
| Epon 1001 | 4 parts |
| Ethyl Acetate | 300 parts |

The Epon 1001 is an epoxy resin tackifier material.

One function of the sealer coat or layer is to permit the use of lower temperature during the spacer lamination action, relieve stress, improve the bond between the spacer and the bead surfaces and binder coat, and improve the weathering properties of the sheet. It was found that a sealer coat eliminates the need to chemically treat the surface of the beads with coupling agents, such as silane or chrome complexes.

FIG. 6 shows that the glass beads 50 as forced to the opposite surface of the binder layer 36 at the primer layer 34 by the rolls 54 and 56 form convex arcs by the protruding portions of the beads meeting convex surface portions of the binder layer between the individual beads. This produces relatively sharp corners or connections of the beads and surface portions of the binder layer. By applying a low viscosity sealer material over the beads and drying it, a base for good bonding of the spacer film C to the laminate D is provided.

To form the end product of the invention, lamination of the spacer laminate C to the glass bead carrying laminate D is effected as shown in FIG. 8. The clear or non-metallized face of the spacer layer 38 is laminated to the sealer coated bead surface of the laminate D. The beaded laminate D is preheated by heaters 62 if the laminate can be preheated without damage, and such coated bead surface is brought into adhesive engagement with the uncoated plastic surface of the laminate C by a heated steel roll 64 that is maintained at a temperature of about 200° to 210° F. Such metal roll is engaged with a rubber surface roll 66 which is heated to a temperature of between about 125° to 250° F. and which has a durometer of from about 25 to about 45, Shore scale A. The spacer laminate C has its metallized layer 40 against the rubber roll. The end size of the spacer film and resultant hemispherical conformation around the beads are controlled by the temperature of the rolls 64 and 66, the durometer of the roll 66, the pressure exerted thereon by the rolls and the time of passage through the nip between the rolls. The pressure exerted by the rolls can vary between 100 psi and 1200 psi. From the rolls 64 and 66, and end laminate E is provided by having the carrier film 10 with the release layer 18 carried thereby separated from the remainder of the laminate which provides the end product, laminate E, that is wound up on a carrier roll 68.

The physical dimensions of the spacer film 38 and its resultant hemispherical conformation around the beads are altered and controlled by the temperature, pressure and dwell time at the nip of the rolls 64, 66. Further, it was discovered that the low durometer hardness of the rubber roll 66 is essential in controlling and conforming the preformed metallized spacer film into a hemispherical mirror onto the back sides of the beads and to contour the spacer film in such a way as to bond to the contour of the binder film surrounding the spherical beads.

In practicing the invention, obviously the various steps in processing to form the layers of and the laminates of the invention are carefully monitored and controlled. The various coating rolls 14, 16, 24, 26, 28, etc. are all uniformly sized and accurately positioned to apply uniformly thick coats or layers of the various materials to the carrier means used in forming the laminate of the invention. The various ovens used in the apparatus are suitably controlled in temperature and length so as to provide the desired drying or partial cure actions on the materials being processed and at the same time to avoid interference between the then deposited coating in relation to any previous coating layers in the laminate being processed and avoid softening the prior films or layers as to distort them in processing the laminates.

Usually the speed of movement of the continuous film being processed in the apparatus is at least 15 ft. per minute, but this can be varied depending upon the desired drying times, laminating pressures, etc.

The glass beads used in forming the laminate of the invention have a relatively high index of refraction such as 2.0 and above although beads having an index of refraction somewhat lower, such as 1.9 can be used when a proper spacer film is used in association with such type of a glass bead. The glass beads used are of conventional commercial construction and preferably 80% of the beads used pass through a Tyler mesh screen of 200 mesh but collect on a 230 Tyler screen. The beads preferably are in the range size of 2.48 to 2.96 mil.

When using rubber covered rolls in the process of the invention, normally the rubber surface on the roll comprises a heat resistant, silicone rubber. The layers in the laminate of the invention are not necessarily shown in correct relative sizes. The finished laminate, for example, would be about 7 mils thick.

When applying the spacer films in the laminates of the invention, and in preforming such spacer films, the spacer thickness is correlated with the refractive index of the binder material used, and the spacer film, by being preformed, maintains a uniform thickness as it softens slightly and is forced to flow around the hemispherical bead surfaces to provide a uniform coating thereon so that the lens action of the bead, together with the mirrorlike reflective action of the metallized outer surface on the spacer film provides the desired retroreflective action in the end laminate.

Use of the transparent Mylar carrier film 10 facilitates rapid inspection of the end product to insure that the desired uniform bonding of the laminates C and D is achieved.

The acrylic face film or layer has another desirable function in that it is tough enough as to be inpenetratable by the glass beads used. Hence, when forcing the glass beads into the laminate, as described in the specification with relation to the action of the rolls 54 and 56, the face layer or the primer layer when carried thereon terminates penetration of the beads into the laminate.

From the foregoing, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. In a method of making a retroreflective laminate, the steps of applying a binder layer to a face layer, applying glass beads to the surface of said binder layer and embedding them in such layer but having said glass beads protruding from said binder layer, applying a liquid sealer layer to the surface of the binder layer and the protruding glass beads, drying to obtain a sealer layer that follows the contour of the protruding glass beads and the binder layer surface on both the inner and outer surfaces of such sealing layer, heating the resultant laminate, and laminating a preformed uniform thickness spacer film to the sealer, glass bead and binder layer under controlled heat conditions to bond the spacer film thereto, the spacer film substantially maintaining its uniform thickness as it is heated and laminated to the sealer-glass bead binder layer, the sealer layer aiding the bonding of the spacer film to the bead-binder surfaces, the spacer film having a metal reflective layer on its outer surface in the completed retroreflective laminate.

2. In a method of making a retroreflective laminate, the steps of applying a binder layer to a face layer, applying glass beads to the surface of said binder layer and embedding them in such layer but having said glass beads protruding from said binder layer, heating the laminate with the glass bead layer thereon, and laminating a preformed uniform thickness spacer film to the glass bead-binder layer under controlled heat conditions to soften the spacer film and shape the spacer film to the contour of the glass beads and provide a uniform coating of such film over the protruding glass beads, the spacer film having a metal reflective layer on its outer surface in the completed retroreflective laminate which is designed to receive light rays on its face layer.

3. In a method of making a retroreflective laminate, the steps of applying a binder layer to a face layer, applying glass beads to the surface of said binder layer and embedding them in such layer but having said glass beads protruding from said binder layer, heating the laminate with the glass bead layer thereon, and laminating a preformed uniform thickness spacer film to the glass bead-binder layer under controlled heat conditions to bond the film and layer together, the spacer film substantially maintaining its uniform thickness as it is heated and laminated to the irregular surface of the glass bead-binder layer, the spacer film having a metal reflective layer on its outer surface for reflecting light rays impinging on the face layer.

* * * * *